United States Patent [19]

Jeong

[11] Patent Number: 5,896,488
[45] Date of Patent: Apr. 20, 1999

[54] METHODS AND APPARATUS FOR ENABLING A SELF-PROPELLED ROBOT TO CREATE A MAP OF A WORK AREA

[75] Inventor: Joon-Young Jeong, Seoul, Rep. of Korea

[73] Assignee: Samsung Electronics Co., Ltd., Suwon, Rep. of Korea

[21] Appl. No.: 08/757,546

[22] Filed: Nov. 27, 1996

[30] Foreign Application Priority Data

Dec. 1, 1995 [KR] Rep. of Korea ............... 95-46079

[51] Int. Cl.[6] .......................................... G06F 15/50
[52] U.S. Cl. ........................ 395/90; 395/93; 364/461; 318/580; 318/587; 318/568.12; 318/568.16; 901/1
[58] Field of Search ............... 395/90, 93; 364/461; 318/580, 587, 568.12, 568.16; 901/1

[56] References Cited

U.S. PATENT DOCUMENTS

| | | | |
|---|---|---|---|
| 5,001,635 | 3/1991 | Yasutomi et al. | 364/424.02 |
| 5,280,622 | 1/1994 | Tino | 395/90 |
| 5,402,051 | 3/1995 | Fujiwara et al. | 318/587 |
| 5,446,356 | 8/1995 | Kim | 318/587 |
| 5,456,332 | 10/1995 | Borenstein | 180/167 |
| 5,534,762 | 7/1996 | Kim | 318/568.12 |
| 5,548,511 | 8/1996 | Bancroft | 318/587 |
| 5,568,030 | 10/1996 | Nishikawa et al. | 318/587 |
| 5,610,488 | 3/1997 | Niyazawa | 318/587 |
| 5,621,291 | 4/1997 | Lee | 318/568.16 |
| 5,646,497 | 7/1997 | Han | 318/587 |

FOREIGN PATENT DOCUMENTS

| | | | |
|---|---|---|---|
| 62-116205 | 5/1987 | Japan | G01B 17/00 |
| 4168508 | 6/1992 | Japan | G05D 1/02 |
| 7271435 | 10/1995 | Japan | G05D 1/02 |

*Primary Examiner*—George B. Davis
*Attorney, Agent, or Firm*—Burns, Doane, Swecker & Mathis, L.L.P.

[57] ABSTRACT

A robot includes an obstacle sensing mechanism for sensing an angle formed between a first wall and a forward travel direction of the robot. The robot then travels parallel to the first wall while the obstacle sensing mechanism senses a front distance of the robot from a wall located in front of the robot and sideward distances of the robot from walls located to respective sides of the robot. In response to the sensing of changes in the sideward distances, the robot is able to divide the area into separate cells which together define an environmental map of the area. That map is stored in the robot's memory.

4 Claims, 11 Drawing Sheets

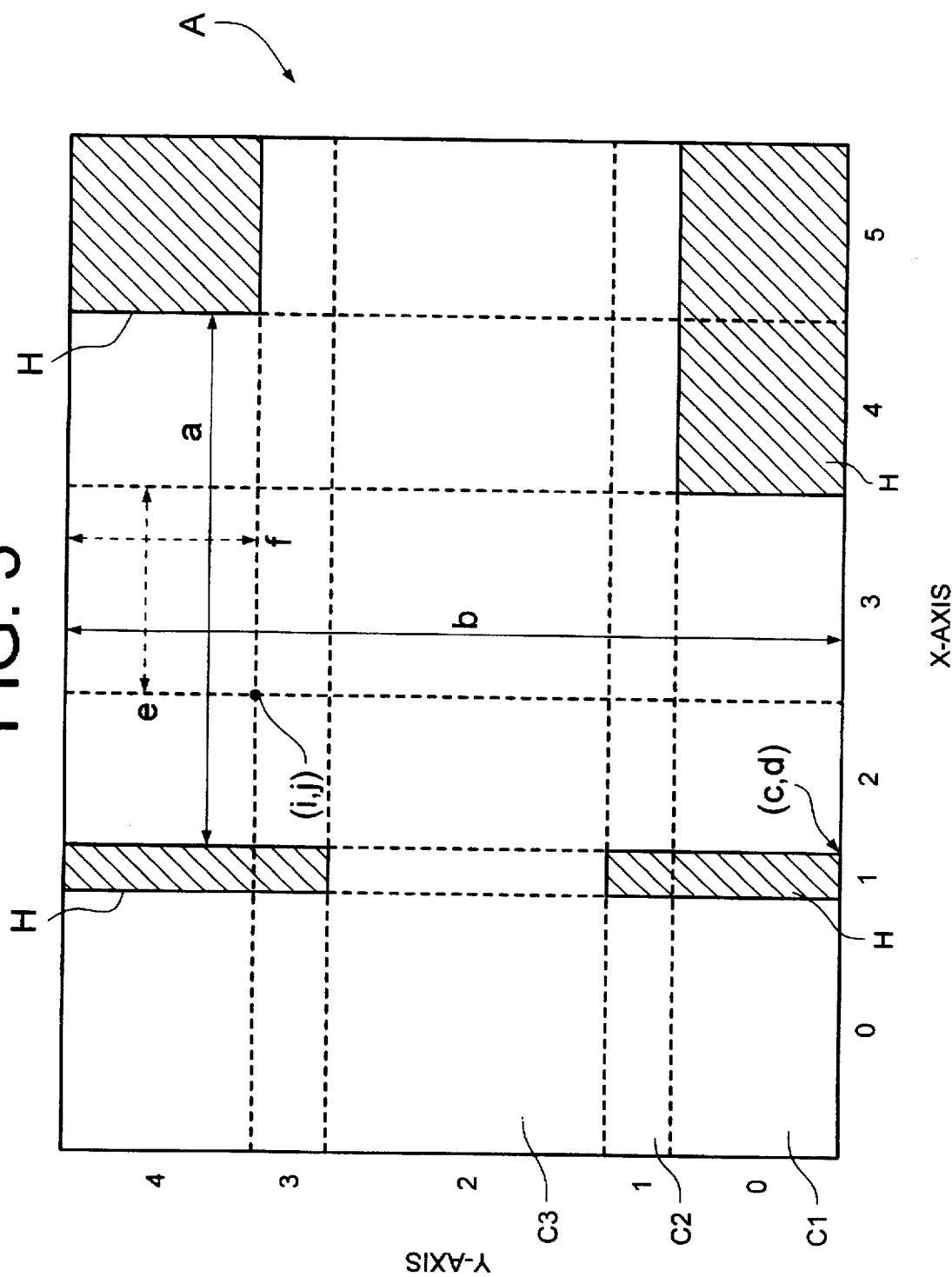

METHODS AND APPARATUS FOR ENABLING A SELF-PROPELLED ROBOT TO CREATE A MAP OF A WORK AREA

BACKGROUND OF THE INVENTION

1. Field of the Invention

The invention relates to a self-propelled robot adapted for example to clean and monitor a work area, the robot memory containing a map of the work area for ensuring a proper travel path of the robot.

2. Description of the Prior Art

Generally, there is disclosed in Japanese Laid-Open patent application No. 4-365104 an apparatus for producing an optimal travel path of a self-propelled robot, as shown in FIG. 1. The apparatus includes a map storage portion 4 for memorizing a map having the cleaning (work) areas and obstacles marked throughout an overall work area, a map producing/updating portion 8 for providing the map with information about environmental conditions and updating the map stored in said map storage portion 4, a travel path searching portion 5 for finding a travel path to a target point by utilizing the map stored in the map storage portion 4, and a travel path producing portion 7 for finding obstacle avoidance paths by utilizing the map stored in the map storage portion 4.

The robot equipped with the above optimal path finding apparatus 9 receives a current position of the robot from a self position recognition portion 2, a position of the target point from an instruction producing portion 1, and data containing information about surrounding obstacles from an obstacle recognition portion 6.

Based upon the received information, the robot may be moved along a planned travel path delivered to a driving portion 3 through the path searching portion 5 or the travel path producing portion 7.

Furthermore, the map producing/updating portion 8 produces a map showing the conditions around the robot on the basis of the information about obstacles received from the obstacle recognition portion 6 when the robot moves and the current position from the self position recognition portion 2 and, based upon the thus-produced map, updates the map showing the overall work place which is stored in the map storage portion 4.

Such a conventional optimal path finding apparatus is not required to use all information about the work area during an initial operation, and is able to define more effective paths every time the finding procedures are performed and to cope with the change of the work area. The apparatus, however, has to move the robot by using the positions of the target point and the robot and the information about the presence of the obstacles, and to update the stored map for overall work area based upon the produced map according to the current position and the presence of the obstacles. This results in the use of a large memory capacity.

In addition to the above-mentioned technique, another prior art is disclosed where the tasks can be effected only by information about the work environments. In such a technique, a given work area is divided into cell units, each having a constant size, of which each cell has necessary information about the presence of the obstacles. The apparatus is provided with signal emitting devices(for example, ultrasonic or infra-red signal generating devices) mounted on the surfaces of the walls in the work area. The robot is able to receive the emitted signals through a receiver located on a predetermined position of a main body of the robot, and travel alongside the wall surface or freely travel within the work area during the initial operation of the robot.

At this time, when a signal emitted from the signal emitting devices, which represents a location of the signal emitting device, is received through the receiver, the robot analyzes and automatically creates the environmental map which is used to clean or monitor.

The above-mentioned technique, however, utilizes only the information about the environment of the work area. Thus, it is difficult for the robot to accurately recognize its current position, and the apparatus also requires a larger memory capacity due to the storage of the information about cells of the same size dividing the given work area.

Furthermore, it is required to have separate external devices for emitting ultrasonic or infra-red waves carrying the positional information, resulting in the complex structure and complicated installation of the apparatus.

Also, due to the quality and state of the floor surface, sliding of the driving wheels of the robot may occur, which prevents the robot from accurately reaching the signal emitting device. Thus, in a case where the receiver does not receive the emitted signals, the robot continues to move to the left or to the right, and vice versa, in order for the receiver to receive the emitted signal. This requires a longer time for the robot to find the current position thereof.

SUMMARY OF THE INVENTION

Therefore, it is an object of the present invention to provide an environment recognition apparatus of the robot and a method which creates and stores the environmental map in a smaller memory capacity without recourse to separate external devices.

It is another object of the present invention to provide an environment recognition apparatus of the robot and a method which enables the robot to travel accurately to the target point by correcting the current position during the tasks thereof, based upon the created environmental map.

The above-mentioned objects can be accomplished by an environment recognition apparatus of a self-propelled robot which performs given tasks, the apparatus comprising:

driving means for moving the robot;

travel distance detecting means for detecting the travel distance of the robot which is moved by the driving means;

direction angle detecting means for detecting change of the direction of the robot which is moved by the driving means;

obstacle detecting means for detecting a distance to an obstacle and to a wall surface within a guarded area thereof;

control means for obtaining a current position of the robot in accordance with a travel distance data detected by the travel distance detecting means and a travel direction data detected by the direction angle detecting means, and for controlling the driving means so that the robot can travel to a target point; and storage means for storing the travel distance data detected by the travel distance detecting means, the travel direction data detected by the direction angle detecting means, and environmental information associated with the obstacle and wall surface detected by the obstacle detecting means.

According to another aspect of the present invention, there is provided a method for environment recognition of a self-propelled robot which performs given tasks within a guarded area, the method comprising the steps of:

calculating an angle formed by the robot and a front wall surface in accordance with a distance to the front wall surface from the robot detected by the obstacle detecting means and perpendicularly aligning the robot to the front wall surface;

detecting distances to front, right and left wall surfaces during the travel of the robot alongside the wall surface and collecting necessary data for respective blocks; and making an environmental map through the analysis of the necessary data for respective blocks collected from said data collecting step.

BRIEF DESCRIPTION OF THE DRAWINGS

Other objects and aspects of the invention will become apparent from the following description of embodiments with reference to the accompanying drawings in which:

FIG. 3 illustrates a configuration of an environmental map made according to the preferred embodiment of the present invention;

DETAILED DESCRIPTION OF THE PREFERRED EMBODIMENT

The preferred embodiment according to the present invention will be described in detail with reference to the accompanying drawings.

Figure 1:
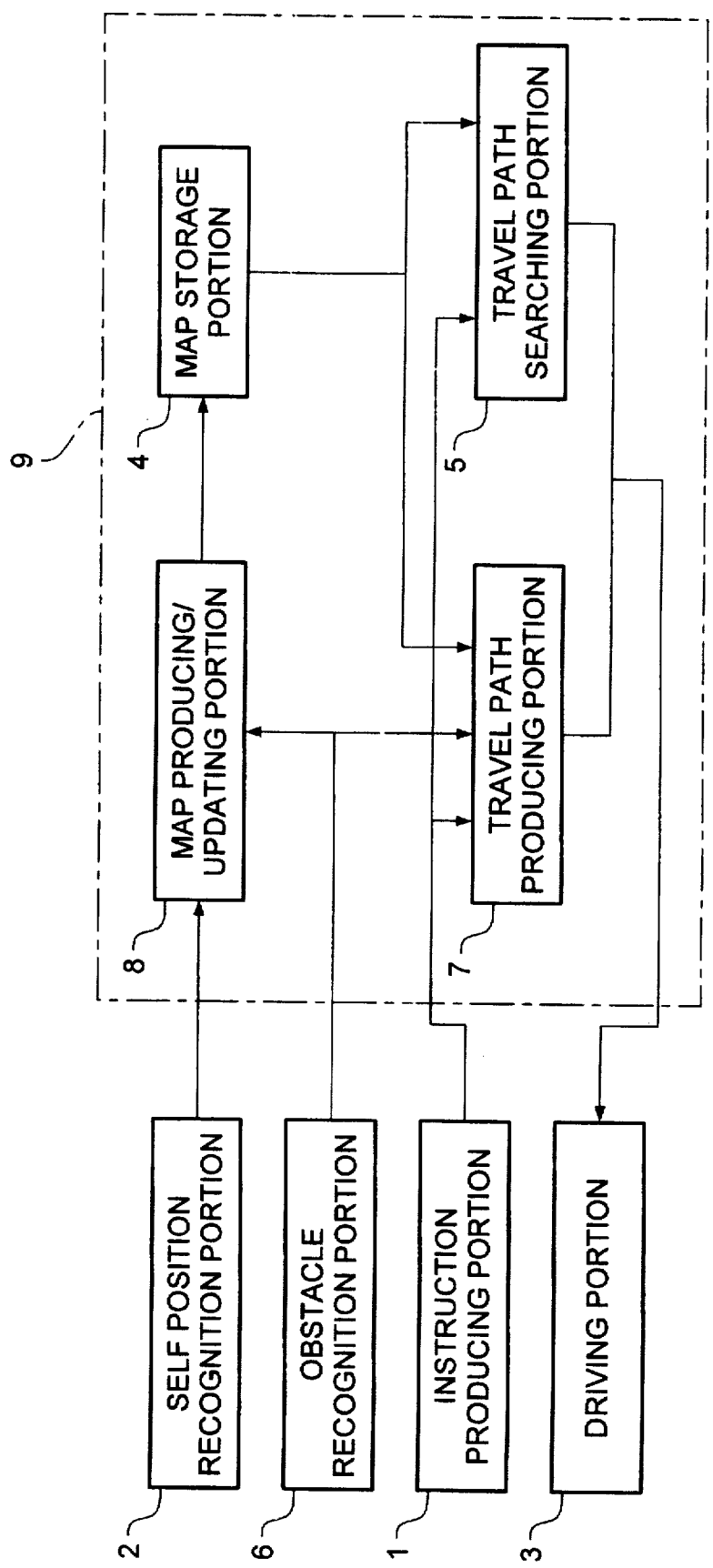
FIG. 1 is a block diagram illustrating a conventional environment recognition apparatus of a robot.
Figure 2:
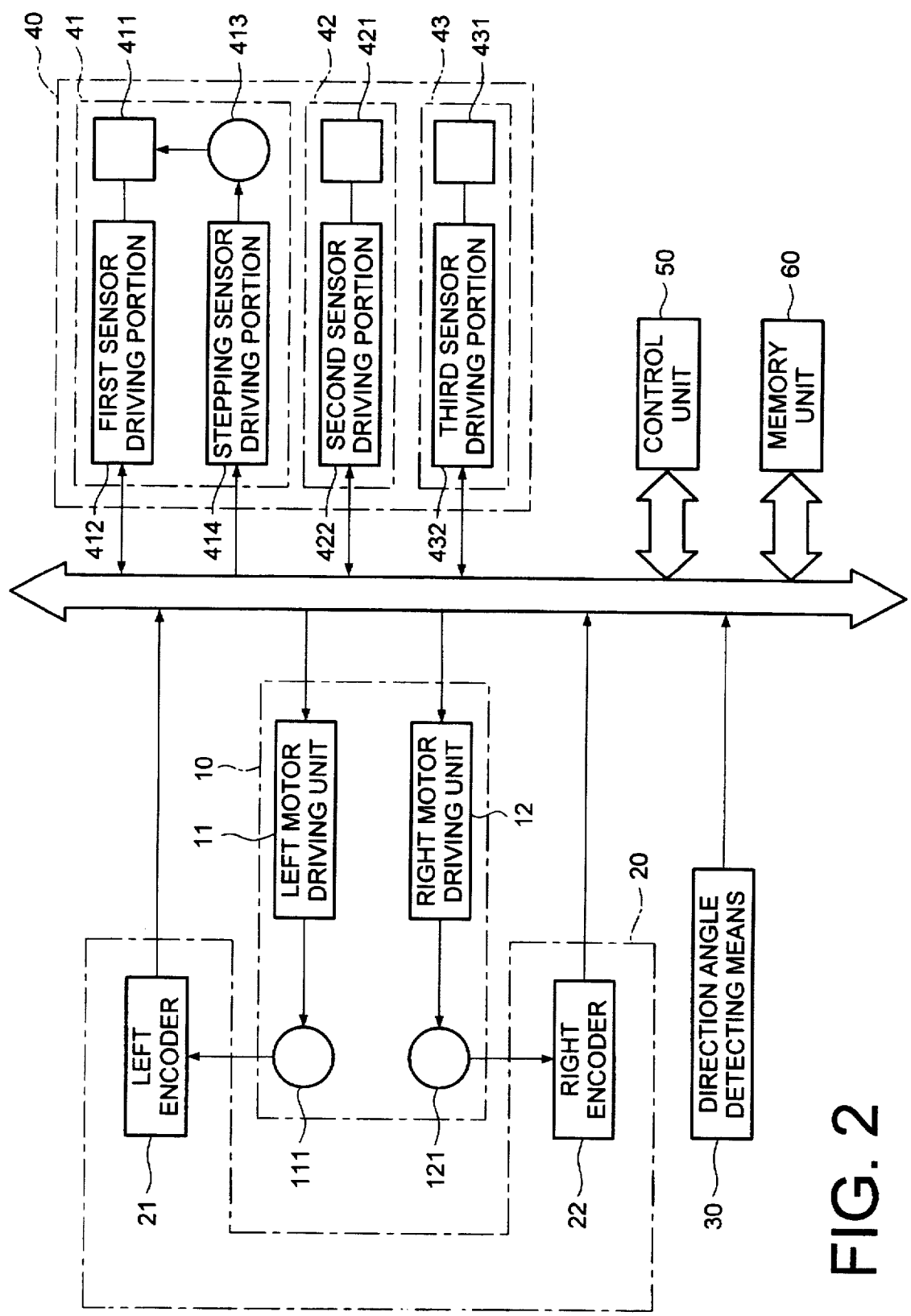
FIG. 2 is a block diagram illustrating an environment recognition apparatus of a robot according to a preferred embodiment of the present invention.

Referring to FIG. 2, driving means 10 is provided for controlling the movement of the robot 1 in every direction, and comprises a left motor driving unit 11 for driving a left travelling motor 111 and moving the robot 1 to the right; and a right motor driving unit 12 for driving a right travelling motor 121 and moving the robot 1 to the left.

The left and right travelling motors 111 and 121 are provided with driving wheels, respectively (not shown).

In the drawing, travel distance detecting means 20 detects a travelled distance of the robot moved by the driving means 10, and includes a left encoder 21 for generating a pulse signal in proportion to the number of revolutions of the left driving wheel rotating under the control of the driving means 10, namely the number of revolutions of the left motor 111 for detecting a travelled distance to the right, and a right encoder 22 for generating a pulse signal in proportion to the number of revolutions of the right driving wheel under the control of the driving means 10, namely the number of revolutions of the right traveling motor 111 for detecting a travelled distance to the left.

Also, direction angle detecting means 30 is provided to detect the change of the travel direction of the robot 1 moving according to the driving means 10 which sensor may be a gyro sensor which detects a travel direction change of the robot 1 by detecting a rotating angle according to a voltage level changing in the course of the turning of the robot 1 by the driving means 10.

Obstacle detecting means 40 serves to detect a distance to an obstacle H and a wall surface W, as well as the presence of the obstacle H which lies in the travel path. The obstacle detecting means 40 includes a first obstacle detecting portion 41 for detecting a distance to either the obstacle H in front of the robot 1 or to the wall surface W, a second obstacle detecting portion 42 for detecting a distance to either the obstacle H on the left of the robot 1 or the wall surface W and a third obstacle detecting portion 43 for detecting a distance to either the obstacle H on the right of the robot 1 or the wall surface W.

The first obstacle detecting portion 41 of the obstacle detecting means 40 has a first ultrasonic sensor 411 which emits an ultrasonic wave forwardly of the robot and receives a reflected, or an echo signal from the wall surface W or the obstacle H to detect a distance to the obstacle H in front of the robot 1 or to the wall surface W, a first sensor driving portion 412 for applying a square wave of, for example, 50 Hz to the first ultrasonic sensor 411 and enabling the first ultrasonic sensor 411 to generate the ultrasonic wave, a stepping motor 413 for oscillating the sensor 411 forwardly and backwardly by 180° as necessary, and a stepping motor driving portion 414 for driving the stepping motor 413.

Also, the second obstacle detecting portion 42 of the obstacle detecting means 40 has a second ultrasonic sensor 421 which emits the ultrasonic wave to the left of the robot and receives a signal reflected from the wall surface W or from the obstacle H to the to detect a distance to the obstacle H left of the robot 1 or to the wall surface W, and a second sensor driving portion 422 for applying a square wave of 50 Hz to the second ultrasonic sensor 421 and for enabling the second ultrasonic sensor 421 to generate the ultrasonic wave.

Also, the third obstacle detecting portion 43 of the obstacle detecting means 40 has a third ultrasonic sensor 431 which emits the ultrasonic wave to the right of the robot 1 and receives a signal reflected from the wall surface W or from the obstacle H to detect a distance to the obstacle H to the right of the robot 1 or the wall surface W, and a third sensor driving portion 432 for applying a square wave of 50 Hz to the second ultrasonic sensor 431 and for enabling the second ultrasonic sensor 431 to generate the ultrasonic wave.

In the drawing, the control means 50 may be a microprocessor which is operated to: (1) calculate a current location of the robot 1 an the basis of the traveled distance data detected by the travel distance detecting means 20 and the travel direction data received from the direction angle detecting means 30 at a predetermined time interval, (2) calculate a distance to each wall surface located in the forward and lateral directions and the angles formed by the robot 1 relative to each of the walls on the basis of the data from the obstacle detecting means 40, and (3) determine the travel path of the robot 1 in accordance with the results obtained from the above calculations and operate the left and right travelling motor 111 and 121, so that the robot 1 can travel accurately to the target point without departing from a normal path of the robot 1.

And, memory means 60 serves to store the environmental information of the travel distance data obtained by the travel distance detecting means 20, the travel direction data obtained by the direction angle detecting means 30, the data output from the obstacle detecting means 40 associated with the obstacles and the walls, and to provide the information through an input/output port of the control means.

The above-mentioned robot 1 makes an environmental map for the work area during the initial operation thereof, and the configuration of the map will be described in detail with reference to FIG. 3.

FIG. 3 shows an area A having an obstacle H such as a piece of furniture or the like, and a wall W. The area A is divided into a plurality of cells (e.g., cells C1, C2, C3, etc.) formed by imaginary broken lines extended from the boundaries of the obstacles H. The area is defined by an X-axis and a Y-axis (see FIG. 3), and the cells can be identified by numerals disposed along those axes. Thus, for example, cell C1 can be identified as (0,0), i.e., by zero along the X-axis, and zero on the Y-axis. Likewise, the cells C2 and C3 can be identified as (0,1) and (0,2), respectively. In the drawing, "a" denotes a maximum span (X-Span) in the x direction and "b" denotes a maximum span (Y-Span) in the y direction; (c, d) denotes the origin (X-org, Y-org) from which X-Span and Y-Span are measured; e denotes the x directional size X-Size of one cell; f denotes the y directional size of one cell; and (i, j) indicates the origin (X-Origin, Y-Origin) of each cell.

The operation and advantages of an environmental recognition apparatus and control method therefor of the robot according to the present invention will now be described in detail in accordance with the accompanying drawings.

Figure 4A:
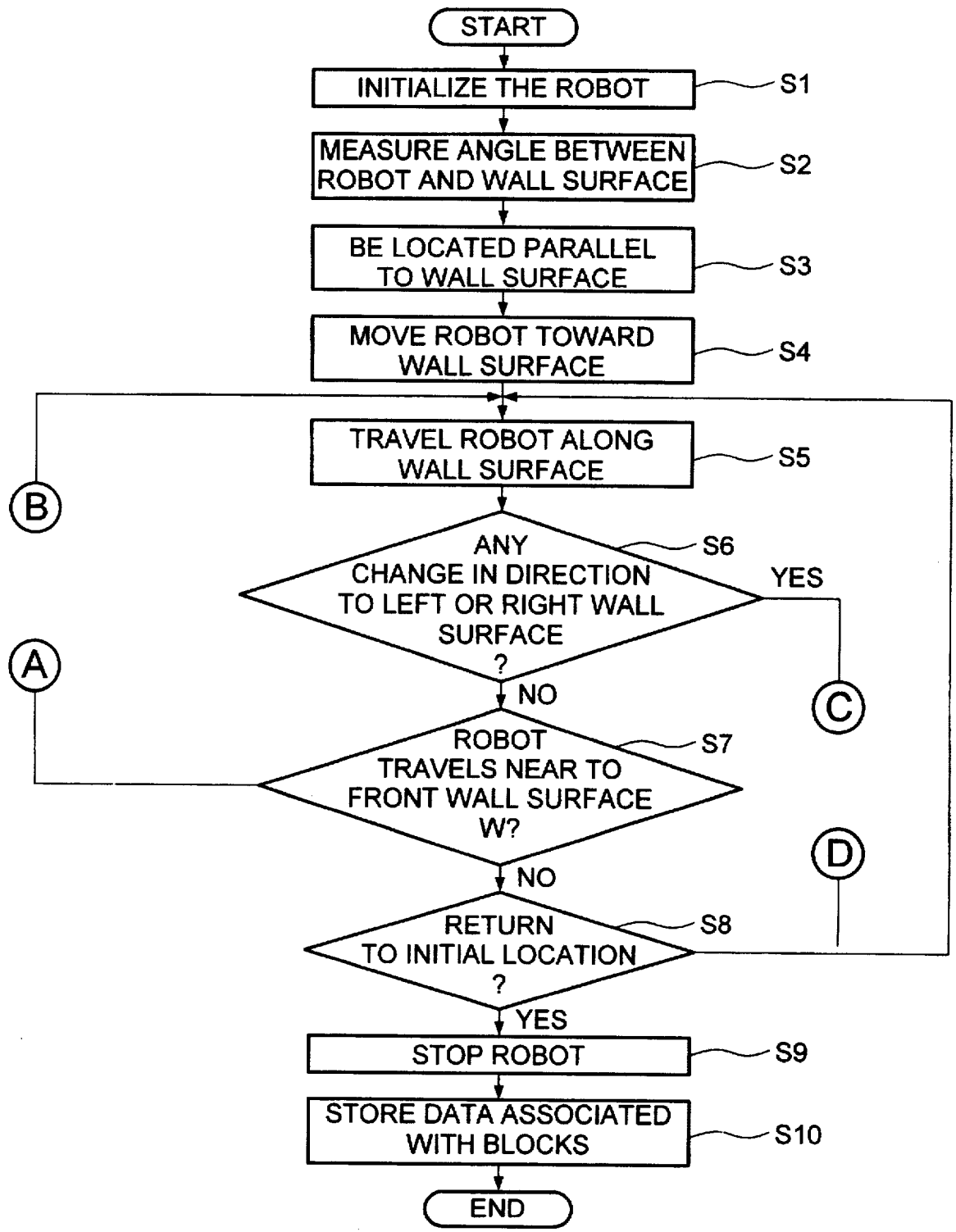
FIG. 4 is a flow chart for describing sequential procedures for creating an environmental map of the robot according to the present invention.
Figure 4B:
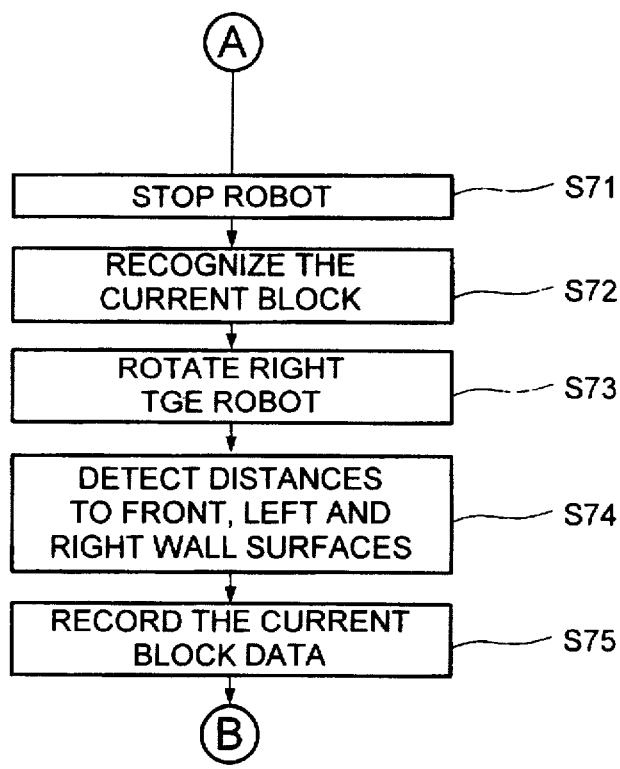
Figure 4C:
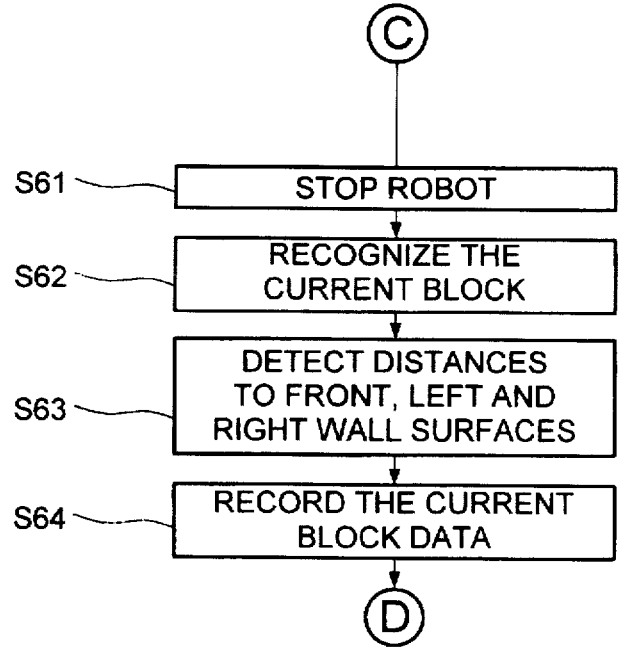

FIG. 4 is a flow chart which illustrates the procedures for making an environmental map of the robot according to the preferred embodiment of the present invention.

After the driving voltage supplied from the power supply means (not shown) is applied to the control unit 50 when the user activates an operational switch located at a predetermined position on the robot 1, the robot 1 is initialized in step S1. The initialization allows the robot 1 to start making the desired map having the environmental information.

Next, the process advances to step S2. The robot 1 having the first ultrasonic sensor 411 (see FIG. 4) located on the front surface of the robot 1 may be located at any orientation in the traveling area. The sensor 411, which is oscillated by the stepping motor 413 about a certain angle range of θt, scans a forward scene and emits ultrasonic waves toward the wall surface W1 disposed opposite to the robot 1 in the forward direction.

Figure 5:
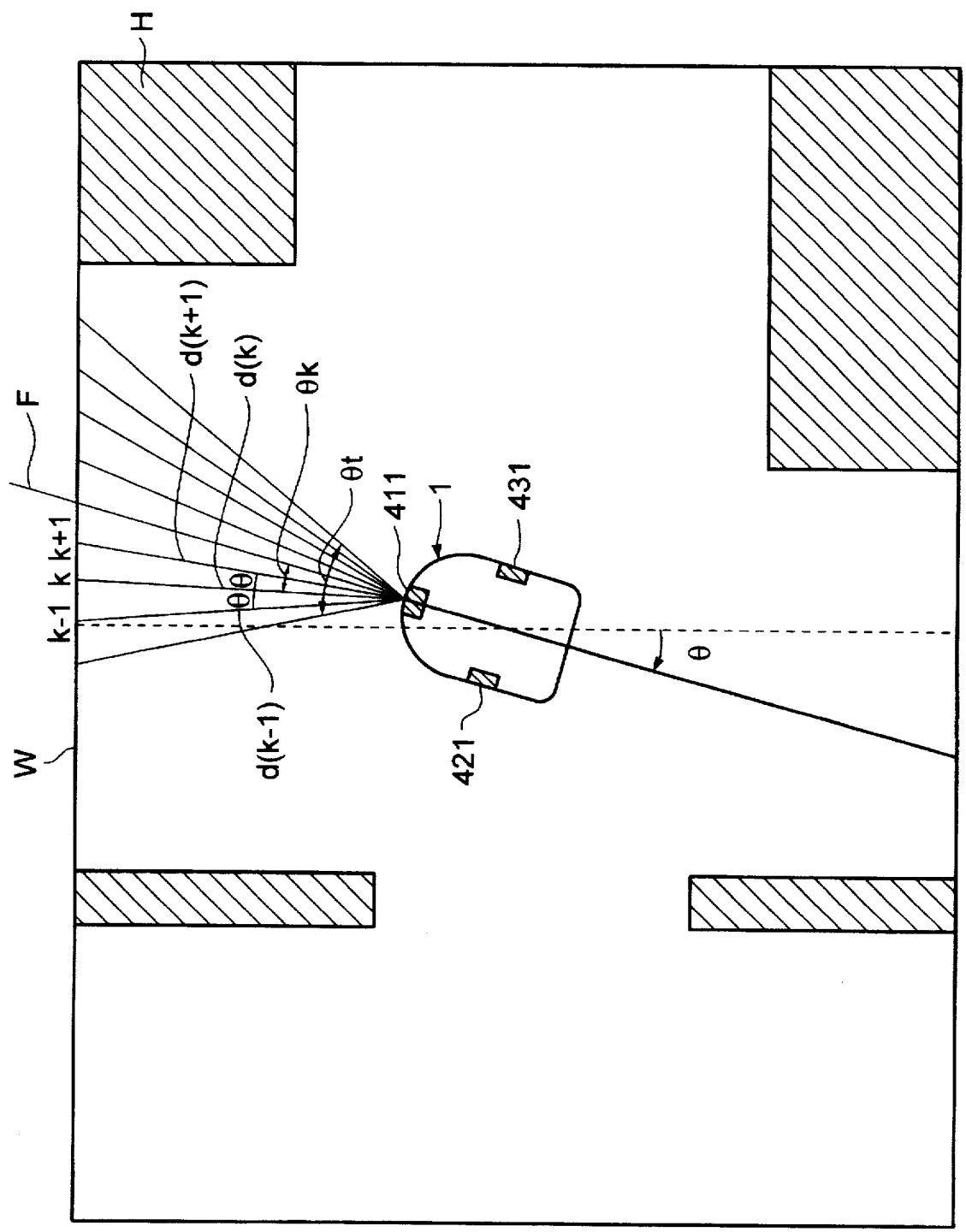
FIG. 5 is a diagram for describing how to calculate an angle formed by the robot and a front wall surface according to the preferred embodiment of the present invention.

The wall surface W1 returns the waves emitted from the sensor 411 to the robot 1 which then receives the returned waves and thereby determines distance d between the robot 1 and the wall surface W1 in the scanned angle (see FIG. 5). The minimum scanned distance is chosen which may then be used to represent the minimum distance between the robot 1 and the wall surface W1 and will be used in calculating an angle between the robot 1 and the wall surface W1 as will be described with reference to FIG. 5.

The distances d(k−1), d(k), and d(k+1) are measured in respective directions k−1, k, and k+1 during rotation of the first scanner 411. The following relationships can be expressed, where the k direction is normal to the wall surface W1:

$$\cos^{-1}\{d(k)/d(k-1)\}=\cos^{-1}\{d(k)/d(k30\ 1)\}=\Delta\theta,$$

when $\cos\Delta\theta\cdot d(k-1)=\cos\Delta\theta\cdot d(k+1)=d(k)$; and $0<\cos^{-1}\{d(k)/d(k-1)\}<\Delta\theta$, $0<\cos^{-1}\{d(k)/d(k+1)\}<\Delta\theta$, when $d(k-1)=d(k)$ or $d(k+1)=d(k)$ Among the directions which meet the relationship of $0<\cos^{-1}\{d(k)/d(k+1)\}<\Delta\theta$, the minimum distance in those directions corresponds to the distance measured in the direction k perpendicular to the wall surface W1.

An angle θ between the robot 1 and the wall surface W1 can be approximated to the above measured angle θk between the direction k perpendicular to the wall surface W1 and the forward direction F of the robot 1, i.e., the direction in which the robot is facing.

Figure 6:
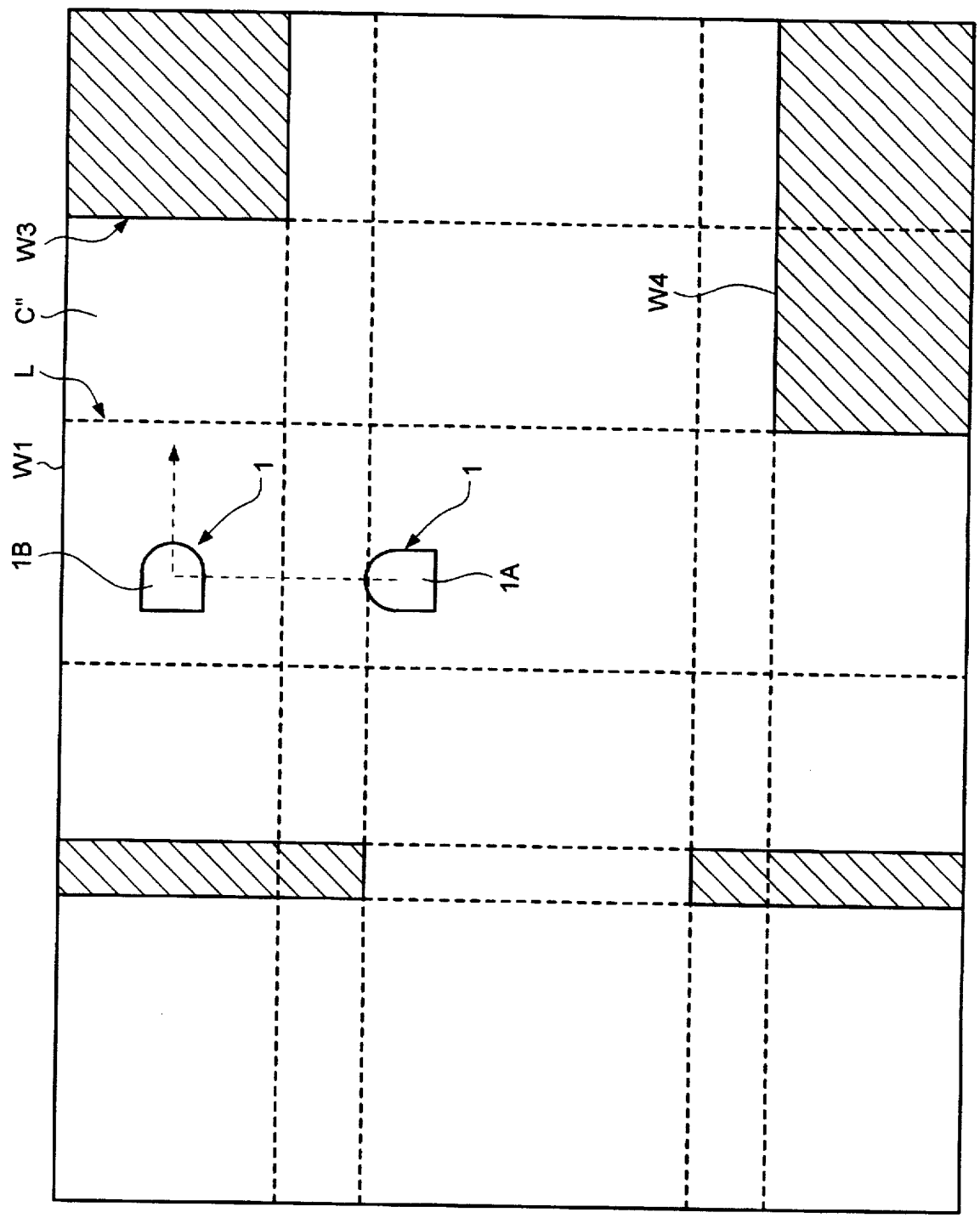
FIGS. 6, 7, 8 and 9 are diagrams depicting respective stages of robot travel in creating an environmental map.

In step S3, the driving means 10 receives the control signal generated from the control means 50 to drive the right travelling motor 121. As shown in FIG. 6, the robot 1 at location 1A is thereby rotated to the left by θk so that the robot 1 is located perpendicular to the nearest wall surface W1. Next, in step S4, the control means 50 drives both the left travelling motor 111 and the right travelling motor 121 to move the robot 1 forwardly towards that wall surface W1 to a position 1B. Thereafter, the robot 1 is rotated to the right by 90°, thus allowing the second ultrasonic sensor 412 located on the left side of the robot 1 to face the wall surface W1. Then, the robot 1 is stopped immediately after the rotation operation of the robot 1. Here, the cell C in which the robot is now positioned is assigned a cell number, (0, 0), and the direction and position of the robot 1 are defined as +x and (0,0), respectively. The robot then emits ultrasonic waves from the first, second and third ultrasonic sensors 411, 421 and 431 towards the respective front, left and right wall surface, and calculates, based upon the returns from the walls, the respective distances between the robot 1 and the right and left wall surfaces, and outputs the resultant data to the control means 50.

The above-mentioned control means 50 calculates X-Span, Y-Span and the origin (X-Org, Y-Org) relative to the above X-Span and Y-Span, and stores them.

Then, the process advances to step S5. In step S5, the control means 50 drives the left and right travelling motors 111 and 121 in accordance with the control means 50 to move the robot 1 parallel to the wall surface W1, with the robot 1 spaced apart from the wall surface W1, as shown in FIG. 6.

When the robot 1 is moving along the travel path parallel to the wall, the process advances to step S6 in which the robot 1 emits ultrasonic waves from the second and third ultrasonic sensors 421 and 431 by the second and third sensor driving portion 422 and 432 towards the respective left and right wall surfaces W1, W2 and calculates, based upon the returns from the walls, the respective distances between the robot 1 and the right and left wall surfaces, and outputs the resultant data to the control means 50 as respective set values.

Using the resultant data, the control means 50 determines whether or not the distances to the right wall surface or the left wall surface are outside of the set values. In case the detected distances remain within the set values (in case of NO), the process goes to step S7 in which the determination is then made whether or not the robot 1 travels near the front wall surface W3 resulting from its movement along the wall surface W1.

If the robot 1 is not positioned near the front wall surface W3 step S7 produces a negative response. The process advances to step S8 in which the determination is made whether or not after the robot 1 has traveled along the wall surface W1, the robot 1 has returned to its initial location at which an initial travel of the robot had started. If not, the process returns to step S5 in which the procedures are again repeated.

In step S8, in case the robot has returned to its initial location (in case of YES), the travel for making the environmental map should be stopped, and the process thus advances to step S9 which stops the travel of the robot 1. Then, the process advances to step 10 in which all data associated with the cells obtained from steps as described above are stored in the storage of the robot 1, and the travel of the robot 1 for the environmental map is finished.

Figure 7:
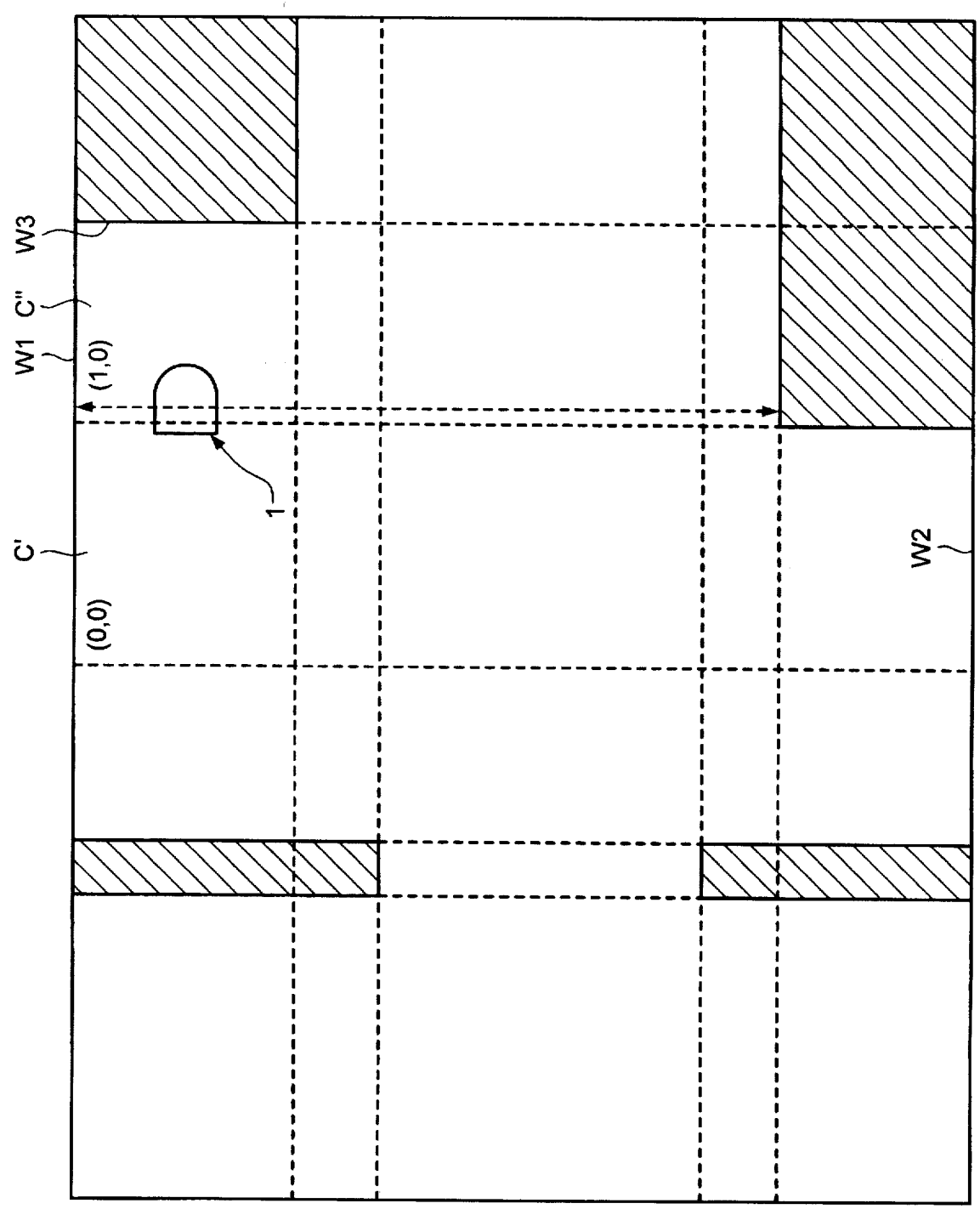

Referring back to step S6, in case the detected distance to either the left or right wall surface W1, W2 is beyond a respective value (in case of YES), it means that the robot 1 is at a new cell, and the robot stops at step S61. That is, once the robot passes the imaginary line L extending from a boundary of the obstacle W4 in FIG. 6, the detected distance to the right wall surface W2 will change (due to presence of wall surface W4), thereby indicating that the robot has entered a new cell C" as can be seen in FIG. 7.

The process advances to step S63 in which the first, second and third ultrasonic sensors 411, 421 and 431 act to detect the distances to the front, left and right wall surfaces, and the obtained resultants are provided to the control means 50.

Thus, in step S64, the control means 50 receives the distance data detected by the first, second and third ultrasonic sensors 411, 421 and 431 and calculates (X-Span, Y-Span) and (X-Org, Y-Org) identifying the current block C" (1, 0), and thereafter the process advances to Step S5 in which the procedures from step S5 to subsequent steps are again repeated.

Figure 8:
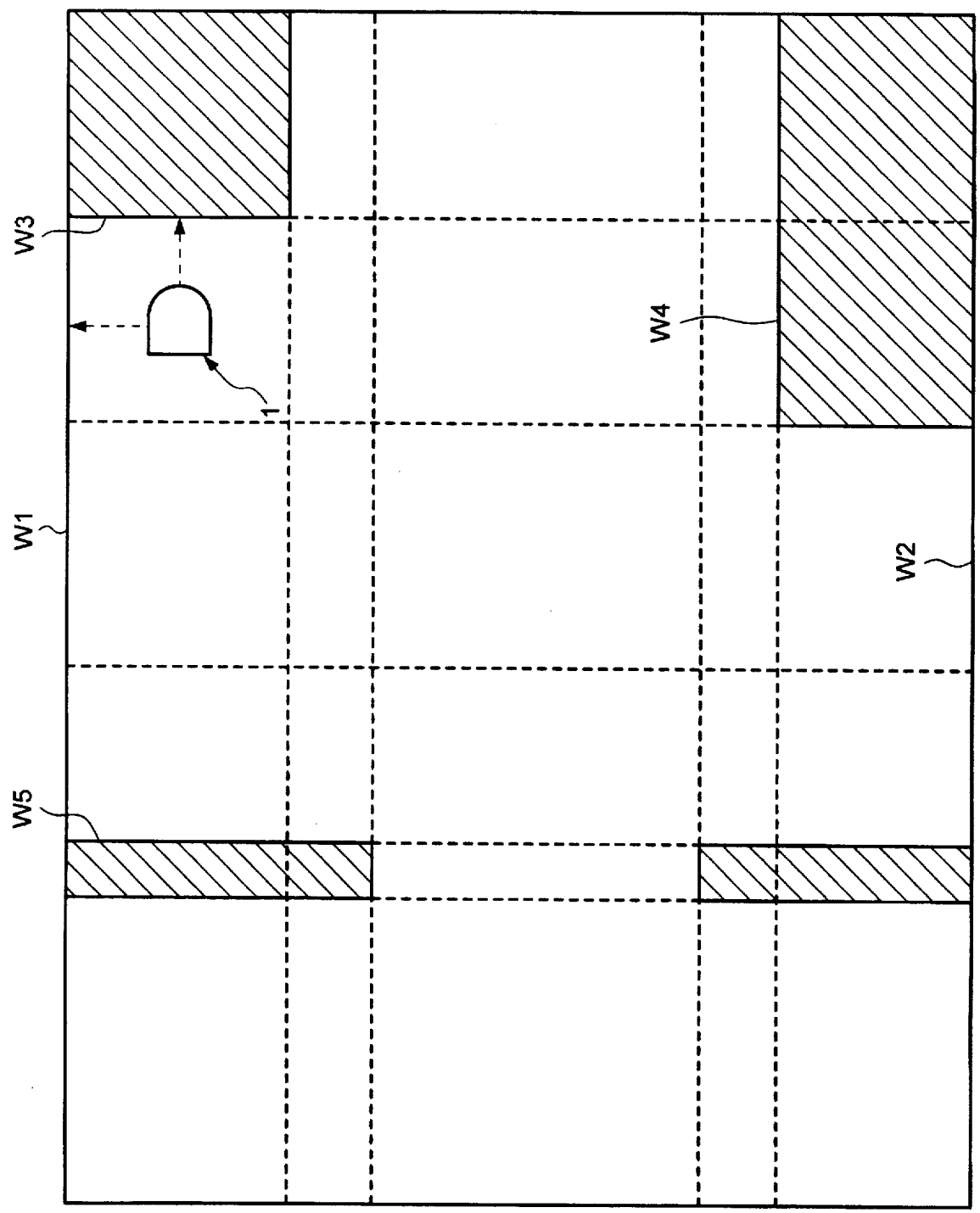

If the robot 1 is positioned near the front wall surface W3 at step 7, i.e., step S7 produces a positive response, the process advances to step S71 in which the robot is stopped. And, if it is confirmed that the robot 1 is positioned near the front wall surface W3, as shown in FIG. 8, the boundaries of the current block (1, 0) at which the robot 1 exists can be recognized, and the process advances to step S73 in which the driving means 10 receives the control signal from the control means 50 and drives the left travelling motor 111 to rotate the robot 1 to the right.

Then, the process advances to step S74 in which the first, second and third ultrasonic sensors 411, 421 and 431 act to detect the distances to the front, left and right wall surfaces W4, W3, W5, and the obtained resultants are provided to the control means 50.

Thus, in step S75, the control means 50 receives the distance data detected by the first, second and third ultrasonic sensors 411, 421 and 431 and calculates and records (X-Span, Y-Span) and (X-Org, Y-Org) identifying the current block (1, 0), and thereafter the process advances to Step S5 in which the procedures from step S5 to subsequent steps are again repeated.

Meanwhile, when the robot 1 is travelling along the wall surface W3, the detection of the relatively longer distance to the left wall surface W6 stops the robot 1 and the block data associated with the detected longer distance are recorded. Thereafter, a point which is for example 50 cm off the boundaries of the area is set as a target point and then, the travel restarts as shown in FIG. 8. When the travel to the target point set is completed, the robot 1 is turned left by 90°, and subsequent steps would be performed.

Also, when the travel direction is either −x or −y direction, the determination is made whether or not the new block number resulting from the movement of the robot 1 from block to block is less than zero. The block number less than zero causes all previously created blocks to be moved to + direction, and thus the new block C is designated as (1,0).

Figure 9:
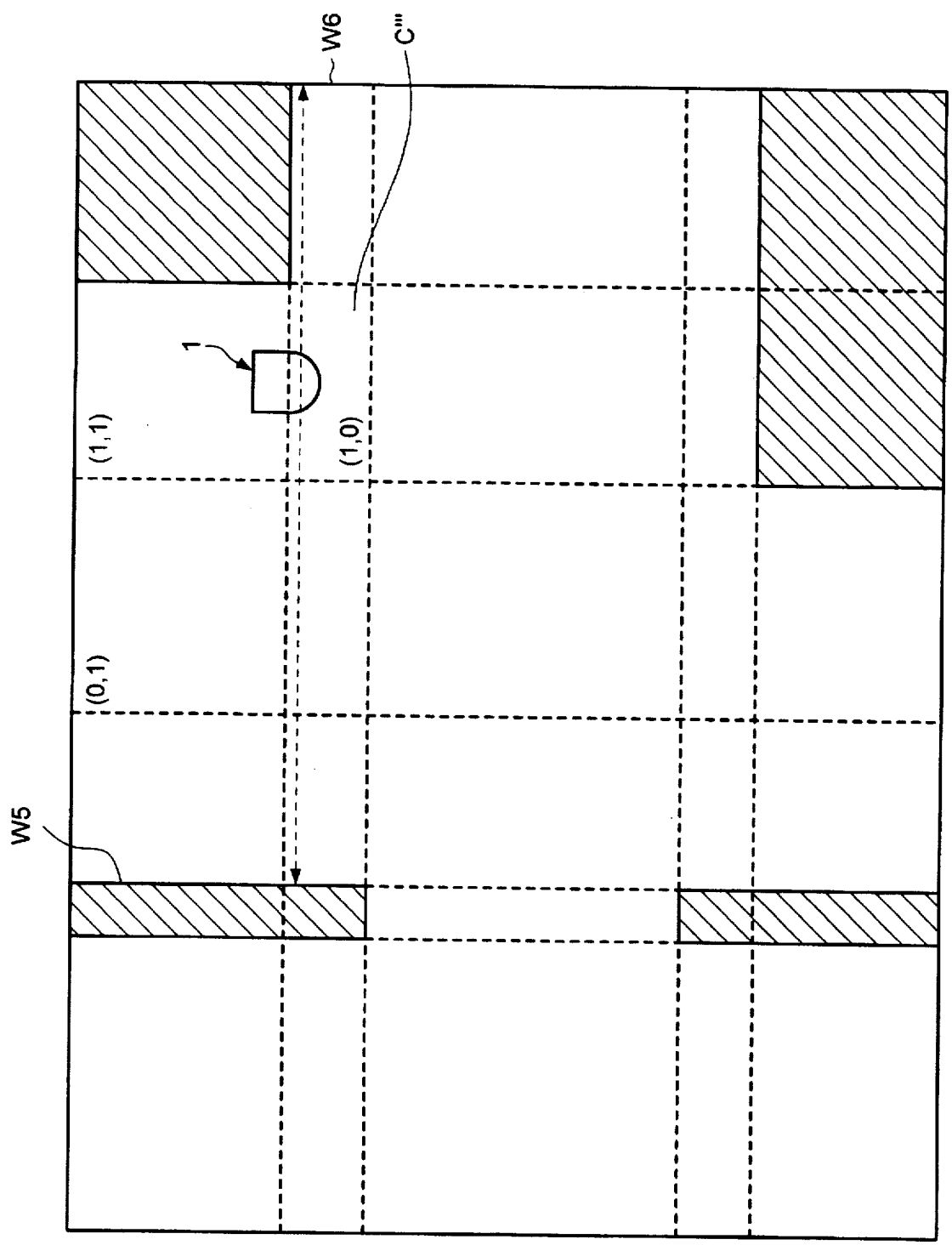
Figure 10:
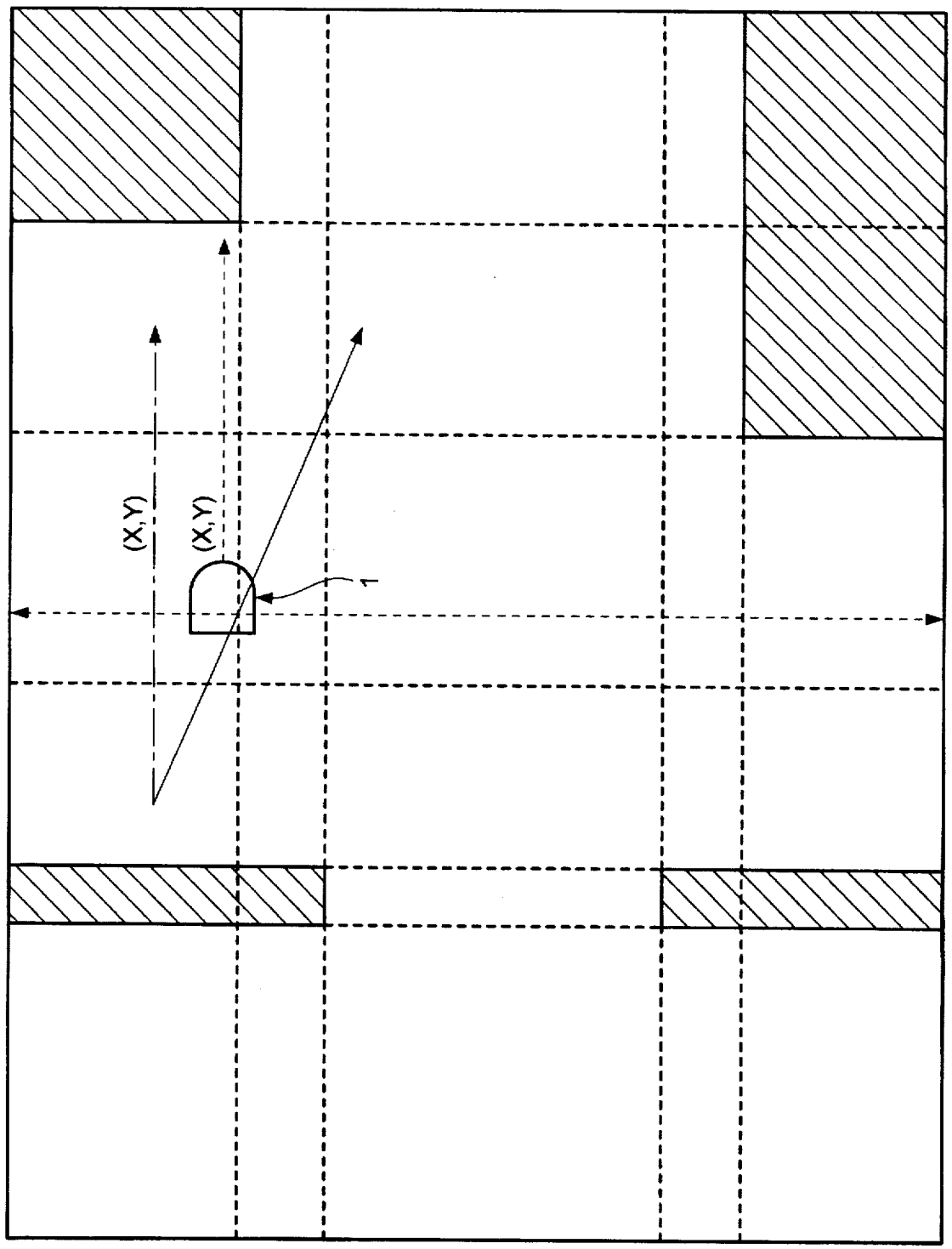
FIG. 10 is a diagram for describing how the current position of the robot is updated according to the preferred embodiment of the present invention.

Next, the entire environmental map is created in such a manner as described above. The updating method of the current coordinates using the environmental map created when the robot 1 is travelling through the given route will be in detail described with reference to FIG. 9.

The robot 1, while travelling along the given travel path, receives at constant intervals the travel direction data detected by the travel distance detecting means 20 and updates the current position of the robot 1 based upon the received data.

For example, when the travelling direction is + direction and the current position is (x, y), the block for the position (x, y) in the environmental map is searched.

Assuming that 1c represents the distance between the central point of the robot 1 and the front wall surface W detected by the first ultrasonic sensor 411, and 1r represents the distance between the central point of the robot 1 and the right wall surface W detected by the third ultrasonic sensor 411, the physical position (x', y') can be obtained from the following equation:

$x'=X\text{-Org}+X\text{-Span}-1c$ $y'=Y\text{-Org}+1r$

When the positional coordinates (x, y) calculated by using the accumulations of the physical position, (x', y') by the above equation and the data detected by the travel distance detecting means 20 and the direction angle detecting means 30 is beyond a certain range, the (x, y) is replaced with (x', y').

The continuation of such operation allows the robot 1 to properly perform the given tasks, while the robot accurately travels to the target point.

As described above, the environmental recognition apparatus of the robot and its method according to the present invention enables the apparatus to create the environmental map requiring relatively smaller memory capacity without separate external devices for storage during the initial tasks, recognize the current location of the activated robot based upon the created environmental map and update the associated position, and thus perform the given tasks of the robot while the robot accurately travels to the target point.

Having described specific preferred embodiment of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A self-propelled robot for creating and storing an environmental map, comprising:

driving means for moving the robot in an area defined by surrounding walls, and obstacles situated within the area;

travel distance detecting means for detecting a travel distance of the robot moved by the driving means;

direction angle detecting means for detecting a change in a travel direction of the robot;

a plurality of detectors for detecting a distance from the robot to an obstacle and to a wall surfaces, respectively, and for detecting boundaries of obstacles;

control means for obtaining a current position of the robot in accordance with travel distance data detected by the travel distance detecting means for directing the robot to a target point by controlling the driving means on the basis of travel direction data detected by the direction angle detecting means; and storage means for storing the travel distance data detected by the travel distance detecting means, the travel direction data detected by the direction angle detecting means, and environmental information associated with the obstacle and wall surface detected by the obstacle detecting means and generating an environmental map which divides the area into cells some of which having a boundary defined by an imaginary line extending from a boundary of a detected obstacle.

2. The apparatus according to claim 1 wherein the detectors are operable to detect a change in a distance to a wall extending parallel to a direction of robot travel, to locate a boundary of an obstacle.

3. A method for operating a self-propelled robot to create and store an environmental map of an area, comprising the steps of:

A) actuating an obstacle detecting mechanism on the robot for determining a plurality of distances between the robot and a first wall surface disposed in front of the robot and calculating therefrom an angle formed between a forward direction of the robot and the first wall surface;

B) actuating a propulsion mechanism of the robot to orient the forward direction of the robot parallel to the first wall surface, and advancing the robot parallel to the first wall surface;

C) actuating the obstacle detecting mechanism while advancing the robot parallel to first wall surface for detecting a forward distance of the robot from a second wall surface disposed in front of the robot, and sideward distances of the robot from the first wall surface and a third wall surface spaced laterally from the robot;

D) dividing the area into separate cells in response to sensed changes in the sideward distances, the cells together defining an environmental map of the area; and E) storing data representative of the cells in a memory of the robot.

4. The method according to claim 3 further including the step of actuating a controller on the robot for updating a current position of the robot with respect to the cells.

* * * * *